UNITED STATES PATENT OFFICE 2,026,920

AZODYESTUFFS

Carl Taube, Leverkusen-I. G.-Werk, and Josef Hilger, Leverkusen-Wiesdorf, Germany, assignors to General Aniline Works, Inc., New York, N. Y., a corporation of Delaware No Drawing. Application October 12, 1933, Serial No. 693,394. In Germany November 5, 1932

4 Claims. (Cl. 260—84)

The present invention relates to new azodyestuffs, more particularly it relates to dyestuffs which may be represented by the probable general formula:

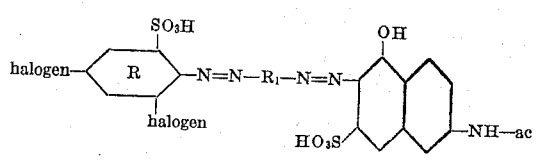

wherein the benzene nucleus R may be substituted by further substituents, such as alkyl, R₁ stands for a radical of the benzene series to which the azo bridges are attached in para-position to each other, such as a benzene nucleus which may be substituted, for example by alkyl, alkoxy and halogen, and *ac* stands for an acyl radical, such as acetyl, benzoyl and a urea radical.

Our new dyestuffs are obtainable by diazotizing a 2,4-dihalogen-aniline-6-sulfonic acid, coupling in an acid medium with a middle component of the benzene series coupling in para-position with respect to the amino group, further diazotizing and coupling with a 2-acylamino-5-naphthol-7-sulfonic acid. Favorably the middle component is coupled in form of its N-ω-methane sulfonic acid, the ω-methane sulfonic acid radical being split off prior to the further diazotization and last coupling.

Our new dyestuffs are in form of their alkali metal salts generally red to dark powders, soluble in water, dyeing the cellulosic fibre generally red to violet shades of good fastness to light.

The invention is illustrated by the following examples, without being limited thereto:

*Example 1.*—30 parts by weight of the potassium salt of 1-amino-2,4-dichloro-5-methylbenzene-6-sulfonic acid are dissolved in water to a clear solution. The calculated quantity of sodium nitrite is added, and the solution is acidified with hydrochloric acid. The diazo compound formed separates in a crystalline form and is coupled in a weakly acid medium with the calculated quantity of m-toluidine. The monoazodyestuff is isolated, diazotized with hydrochloric acid and sodium nitrite, and the diazo compound formed is isolated and coupled in weakly acid to neutral medium with the calculated quantity of 2-benzoylamino-5-naphthol-7-sulfonic acid. The dyestuff having in its free state the following formula:

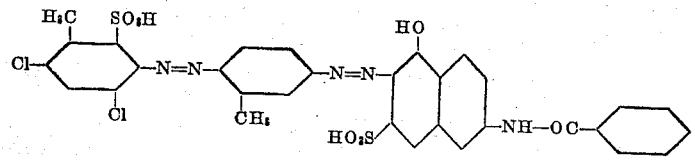

is isolated in the usual manner by salting out and dried. It dyes cotton from a Glauber's salt bath clear red shades.

By substituting the m-toluidine by corresponding quantities of 1-methoxy-2-amino-4-methylbenzene or by 1-methyl-3-amino-4-chlorobenzene, there are obtained dyestuffs having similar properties.

*Example 2.*—41 parts by weight of the potassium salt of 2,4-dichloroaniline-6-sulfonic acid are dissolved in 1100 parts by weight of water at room temperature, 10 parts by weight of sodium nitrite are added, and the clear solution is acidified with hydrochloric acid. The diazonium chloride separates in beautiful colorless crystals which are coupled with the calculated quantity of the ω-methanesulfonic acid of m-toluidine. The bright red intermediate product is hydrolyzed with boiling dilute aqueous sulfuric acid, the aminoazodyestuff is isolated, diazotized and coupled in a weakly acid medium with the mixed urea of 2-amino-5-naphthol-7-sulfonic acid and para-aminoacetanilide. The dyestuff having in the free state the following formula:

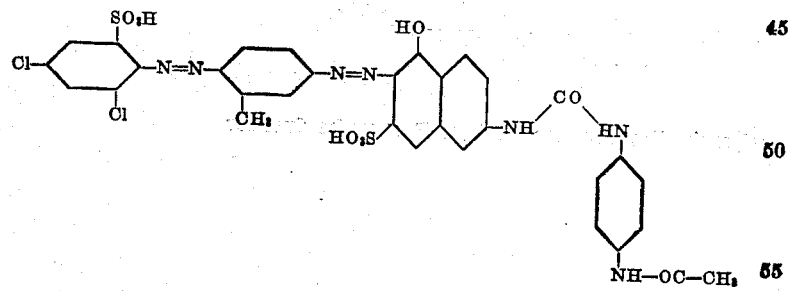

dyes cotton from a Glauber's salt bath clear red shades of excellent fastness to light.

A dyestuff having similar properties is obtained when using as final coupling component the symmetrical urea of the 2-amino-5-naphthol-7-sulfonic acid.

*Example 3.*—10 parts by weight of the potassium salt of 2,4-dichloroaniline-6-sulfonic acid are dissolved in water, 2,4 parts by weight of sodium nitrite are added thereto, and the solution is acidified with hydrochloric acid. The diazo compound is coupled in weakly Congo acid solution with para-xylidine, the bright red precipitate is isolated, dissolved in water with the aid of ammonia, the calculated quantity of sodium nitrite is added to the solution, and the same is acidified by hydrochloric acid. The diazonium compound separated is filtered with suction and coupled in a weakly acid medium with 2-acetylamino-5-naphthol-7-sulfonic acid. The dyestuff obtained having in its free state the following formula:

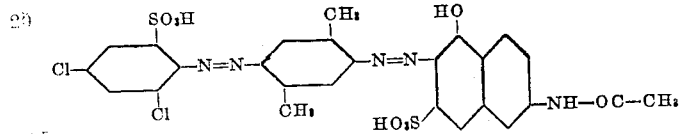

dyes cotton a bluish-red of excellent fastness to light.

By substituting the 2,4-dichloroaniline-6-sulfonic acid by an equivalent quantity of 2,4-dibromoaniline-6-sulfonic acid there is obtained a dyestuff having similar properties.

We claim:

1. Azodyestuffs having in the free state the general formula:

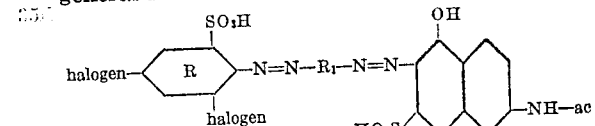

wherein the benzene nucleus R may be substituted by alkyl, R₁ stands for a radical of the benzene series to which the azobridges are attached in para-position to each other and ac stands for an acyl radical, being in form of their alkali metal salts generally red to dark powders, soluble in water, dyeing the cellulosic fibre generally red to violet shades of good fastness to light.

2. Azodyestuffs having in the free state the general formula:

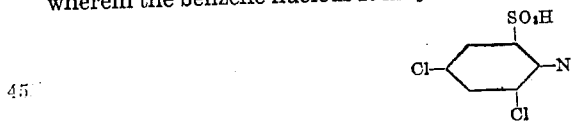

wherein the benzene nucleus R may be further substituted by alkyl, R₁ stands for a benzene nucleus to which the azobridges are attached in para-position to each other and which may bear substituents selected from the group consisting of alkyl, alkoxy and halogen and ac stands for an acyl radical, being in form of their alkali metal salts generally red to dark powders, soluble in water, dyeing the cellulosic fibre generally red to violet shades of good fastness to light.

3. Azodyestuffs having in the free state the general formula:

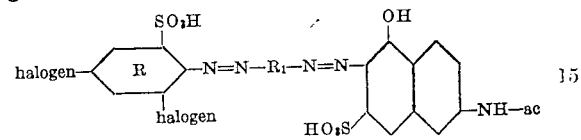

wherein the benzene nucleus R may be further substituted by alkyl, R₁ stands for a benzene nucleus to which the azobridges are attached in para-position to each other and which may bear substituents selected from the group consisting of alkyl, alkoxy and halogen and ac stands for an acyl radical of the group consisting of acetyl, benzoyl and a urea radical, being in form of their alkali metal salts generally red to dark powders, soluble in water, dyeing the cellulosic fibre generally red to violet shades of good fastness to light.

4. The azodyestuff having in the free state the following formula:

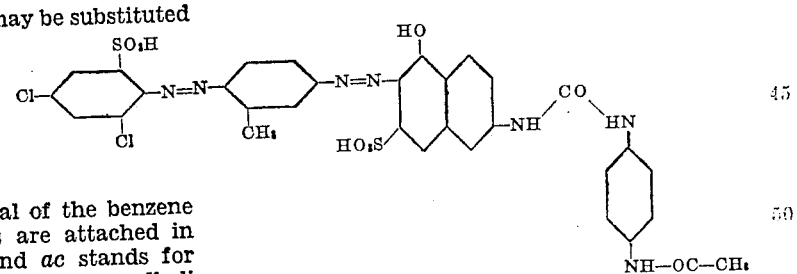

dyeing cotton from a Glauber's salt bath clear red shades of excellent fastness to light.

CARL TAUBE.
JOSEF HILGER.